United States Patent
Yabe et al.

(10) Patent No.: US 7,860,931 B2
(45) Date of Patent: Dec. 28, 2010

(54) PERMISSION-BASED ELECTRONIC MAIL DELIVERY SYSTEM

(75) Inventors: Toshiyasu Yabe, Yokohama (JP); Makoto Soga, Tokyo (JP); Tomoko Enatsu, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1403 days.

(21) Appl. No.: 10/526,114

(22) PCT Filed: Aug. 27, 2003

(86) PCT No.: PCT/JP03/10816

§ 371 (c)(1),
(2), (4) Date: Nov. 3, 2005

(87) PCT Pub. No.: WO2004/021654

PCT Pub. Date: Mar. 11, 2004

(65) Prior Publication Data

US 2006/0101118 A1    May 11, 2006

(30) Foreign Application Priority Data

Aug. 28, 2002    (JP) ............................. 2002-249554

(51) Int. Cl.
*G06F 15/16* (2006.01)
(52) U.S. Cl. ...................................... 709/206; 709/205
(58) Field of Classification Search .................. 709/206
See application file for complete search history.

(56) References Cited

U.S. PATENT DOCUMENTS 5,581,757 A * 12/1996 Maxey ................................ 1/1
5,999,932 A * 12/1999 Paul ................................... 1/1
6,101,244 A    8/2000 Okada (Continued)

FOREIGN PATENT DOCUMENTS

EP    0836301    4/1998

(Continued)

OTHER PUBLICATIONS

Japanese Office Action dated Jan. 30, 2007.

(Continued)

*Primary Examiner*—Bunjob Jaroenchonwanit
(74) *Attorney, Agent, or Firm*—Brinks Hofer Gilson & Lione

(57) ABSTRACT

A transmitting apparatus transmits its own identification information to a terminal station and controls the terminal station to transmit to a relay apparatus a delivery permission registration request including the identification information and the email address of the user of the terminal station. On receiving the delivery permission registration request, the relay apparatus, then, stores in a delivery permission table the identification information of the transmitting apparatus corresponding to the email address, and controls the terminal station to transmit to the transmitting apparatus recipient registration request including the email address. Finally, the transmitting apparatus stores in a recipient list the email address included in the received recipient registration request. Accordingly, an email delivery system is provided, in which, while an email address of a user is registered at a transmitting apparatus offering an email service providing information, the transmitting apparatus offering the email service providing information is surely registered in a delivery permission table, so as to receive only emails which are not regarded as junk mails.

24 Claims, 8 Drawing Sheets

U.S. PATENT DOCUMENTS

| | | | |
|---|---|---|---|
| 6,167,435 A * | 12/2000 | Druckenmiller et al. | 709/206 |
| 6,289,323 B1 * | 9/2001 | Gordon et al. | 705/40 |
| 6,421,709 B1 * | 7/2002 | McCormick et al. | 709/206 |
| 6,581,072 B1 * | 6/2003 | Mathur et al. | 707/104.1 |
| 6,654,787 B1 * | 11/2003 | Aronson et al. | 709/206 |
| 6,708,205 B2 * | 3/2004 | Sheldon et al. | 709/206 |
| 6,799,212 B1 * | 9/2004 | Iyoki | 709/224 |
| 6,842,773 B1 * | 1/2005 | Ralston et al. | 709/206 |
| 6,868,498 B1 * | 3/2005 | Katsikas | 726/14 |
| 6,973,481 B2 * | 12/2005 | MacIntosh et al. | 709/206 |
| 6,988,129 B2 * | 1/2006 | Quine | 709/206 |
| 7,058,684 B1 * | 6/2006 | Ueda | 709/206 |
| 2002/0132607 A1 * | 9/2002 | Castell et al. | 455/412 |
| 2003/0023692 A1 * | 1/2003 | Moroo | 709/206 |
| 2003/0167311 A1 * | 9/2003 | Kirsch | 709/206 |
| 2003/0182380 A1 * | 9/2003 | Yabe et al. | 709/206 |
| 2004/0015554 A1 * | 1/2004 | Wilson | 709/206 |
| 2004/0198322 A1 * | 10/2004 | Mercer | 455/412.1 |
| 2004/0243844 A1 * | 12/2004 | Adkins | 713/201 |
| 2005/0086305 A1 * | 4/2005 | Koch et al. | 709/206 |

FOREIGN PATENT DOCUMENTS

| | | |
|---|---|---|
| JP | H05-207029 | 8/1993 |
| JP | 2002-024146 A | 1/2002 |
| JP | 2003-141043 A | 5/2003 |
| TW | 417378 B | 1/2001 |
| WO | WO 99/63709 | 12/1999 |

OTHER PUBLICATIONS

European Patent Office Communication Pursuant to Article 94(3) EPC issued in EP Application No. 03 791 318.3, issued Jul. 29, 2010, 4 pages.

Supplementary European Search Report issued in EP Application No. 03 79 1318, issued Jul. 12, 2010, 2 pages.

* cited by examiner

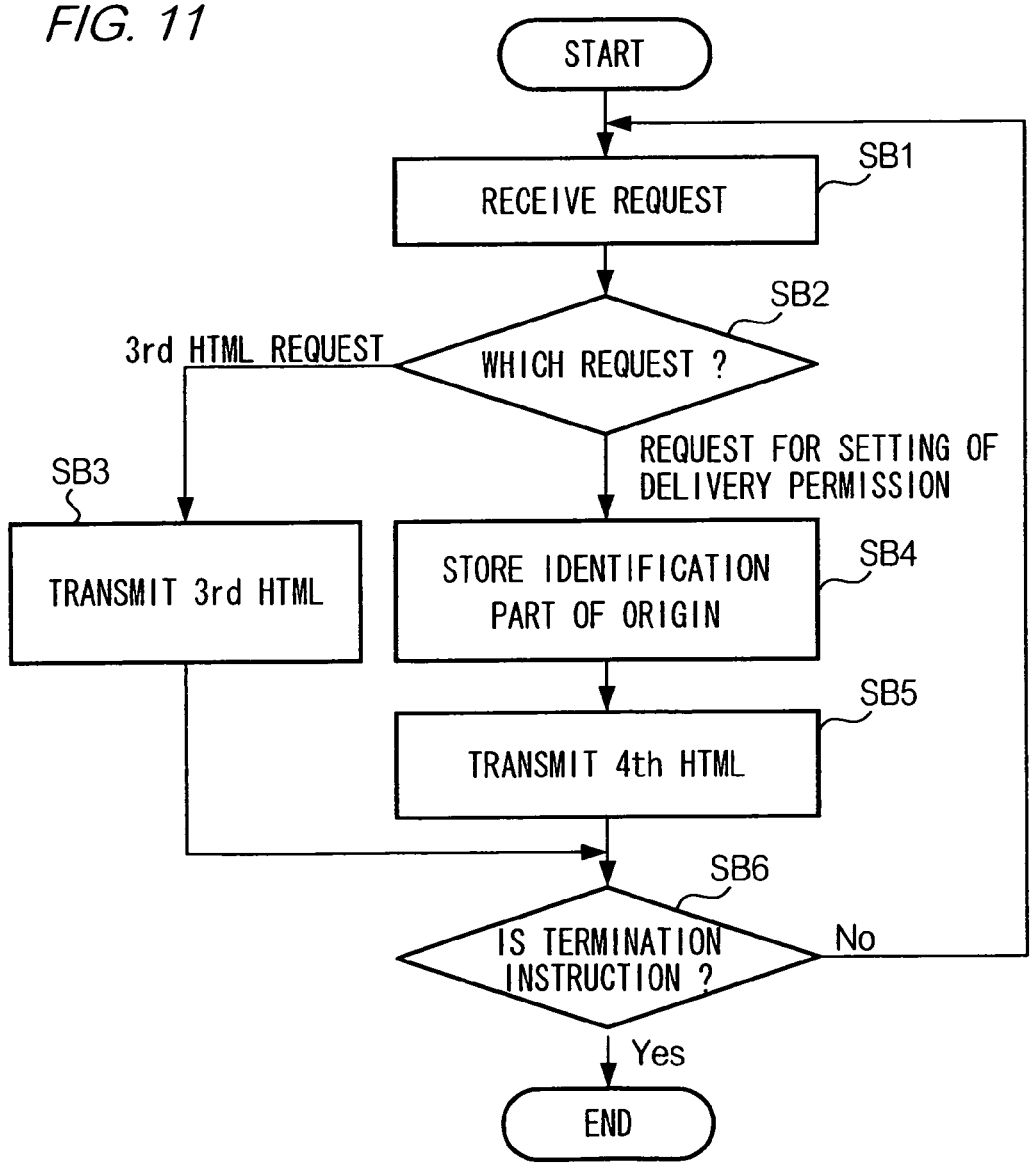

| PHONE NUMBER | EMAIL ADDRESS | |
|---|---|---|
| 090AAAAAAAA | AAA@abc.co.jp | 20 |
| 090BBBBBBBB | BBB@abc.co.jp | 21 |
| 090CCCCCCCC | CCC@abc.co.jp | |

| RECIPIENT | SENDER | |
|---|---|---|
| AAA@abc.co.jp | XXX@xyz.co.jp | 22 |
| BBB@abc.co.jp | XXX@xyz.co.jp | |
| CCC@abc.co.jp | XXX@xyz.co.jp | |

PERMISSION-BASED ELECTRONIC MAIL DELIVERY SYSTEM

TECHNICAL FIELD

The present invention relates to an electronic mail (email) delivery system. In the system, transmitting apparatus provides information service by means of an email. When an email address is registered with the transmitting apparatus, the system ensures that information of the transmitting apparatus is registered in a delivery permission table so as to receive from the transmitting apparatus emails, which are not classified as offensive, unnecessary, or junk.

RELATED ART

Various types of email information providing services are available. To subscribe, a user registers his/her email address with a server unit which provides such a service.

In recent years receipt of an increasing number of emails for advertisement purposes, so-called 'junk email', has become a significant problem for users, since most such emails are useless to a user.

Some email delivery systems are available, which block delivery of such junk emails to users' mobile phones. In such email delivery systems, a user can pre-register identification information of senders in a delivery permission table of a relay apparatus. On receiving an email addressed to the email address of the user, the relay apparatus forwards the email to the mobile phone only if the sender of the email is registered in the delivery permission table.

In such a system, however, a user has to follow a complicated procedure to register in the delivery permission table information of a sender from whom delivery of an email is permitted. The registration procedure is complex, and if a user fails to register information of senders in the delivery permission table when subscribing to the service, emails from those senders will not be delivered to the mobile phone of the user.

SUMMARY OF THE INVENTION

The present invention provides an email delivery system, including: a terminal station accommodated in a first communication network, the terminal station receiving emails transmitted from senders via the first communication network, obtaining from a sender identification data, and transmitting the obtained identification data, the identification data including information identifying a sender of an email which a user of the terminal station wishes to receive; and a relay apparatus for receiving the identification data, and for storing the received identification information corresponding to the email address of the user of the terminal station, the relay apparatus receiving all emails forwarded from senders accommodated in a second communication network to the first communication network, and forwarding only those emails for which identification information is stored corresponding to designated email addresses, wherein the relay apparatus stores the identification information received from the terminal station corresponding to an email address of a user of the terminal station, and then the relay apparatus controls the terminal station to register the email address of the user of the terminal station as a recipient email address at the transmitting apparatus of the sender identified with the identification information.

The identification information of a sender may be assigned in the second communication network to identify the sender of an email. The identification information of a sender is assigned to identify a sender of an email in the second communication network.

The identification information of a sender may be, for example, configured as a prefix of a prescribed length of the email address of the sender of the email, or as a suffix of a prescribed length of the email address of the sender of the email.

The terminal station may obtain identification information identifying one or a plurality of senders; prompt a user of the terminal station to select one user from among the obtained identification information of a plurality of users; and transmit the identification information selected by the user to the relay apparatus.

The relay apparatus may control the terminal station to provide a user interface for transmitting the identification information to the relay apparatus itself, the identification information being transmitted from the sender of the email to the terminal station, and to receive the identification information transmitted according to the user interface.

The relay apparatus may transmit to the terminal station a file, written in a prescribed language, describing procedures of forwarding identification information to the relay apparatus itself, the identification information being transmitted from the sender of the email to the terminal station, and allowing the terminal station to display a screen in accordance with the details of the file, so that the relay apparatus controls the terminal station to provide a user interface for transmitting the identification information to the relay apparatus, the identification information having been transmitted by the sender of the email.

The terminal station may transmit the identification information of a sender to the relay apparatus, the identification information identifying a sender of the email, and then delete the file transmitted from the relay apparatus, or prohibit the terminal station from storing a locator of the file.

On receiving the identification information transmitted from a terminal station, the relay apparatus determines whether the user of the terminal station is allowed to make use of the relay apparatus itself, Only in the case of allowing the user, the relay apparatus obtains the email address of the user, and stores the obtained email address corresponding to the identification information transmitted from the terminal station.

The terminal station may obtain from a sender of an email identification information, identifying a sender of an email, and transmit to the relay apparatus the obtained identification information as well as time information indicating a time of obtaining the identification information.

The relay apparatus may receive the identification information and the time information transmitted from the terminal station.

Only in a case that a difference between the time indicated by the received time information and the time of receiving the time information are shorter than a prescribed time, the relay apparatus may store the received identification information corresponding to the email address of the user of the terminal station.

The present invention provides a relay apparatus, which includes: receiving means for receiving from a terminal station identification information, the terminal station being accommodated in a first communication network, receiving emails transmitted from senders via the first communication network, obtaining from senders their identification information, identifying each sender of an email which a user of the terminal station wishes to receive; storing means for storing the identification information received by the receiving means corresponding to an email address of the user of the terminal station; control means for controlling the terminal station to register the email address of the user as a recipient email address at the transmitting apparatus of the sender identified by the identification information; and forwarding means for forwarding to each recipient each email only those emails whose identification is stored corresponding to a designation email address.

BRIEF DESCRIPTION OF THE DRAWINGS

FIG. 10 is a drawing illustrating a process continuation instruction screen displayed at a display unit of terminal station 30 according to the same embodiment.

FIG. 11 is a flow chart illustrating a flow of delivery permission registration performed by relay apparatus 20 according to the same embodiment.

PREFERRED EMBODIMENTS

Details of an email delivery system according to an embodiment of the present invention will be described with reference to the attached drawings.

A. The Entire Configuration

Figure 1:
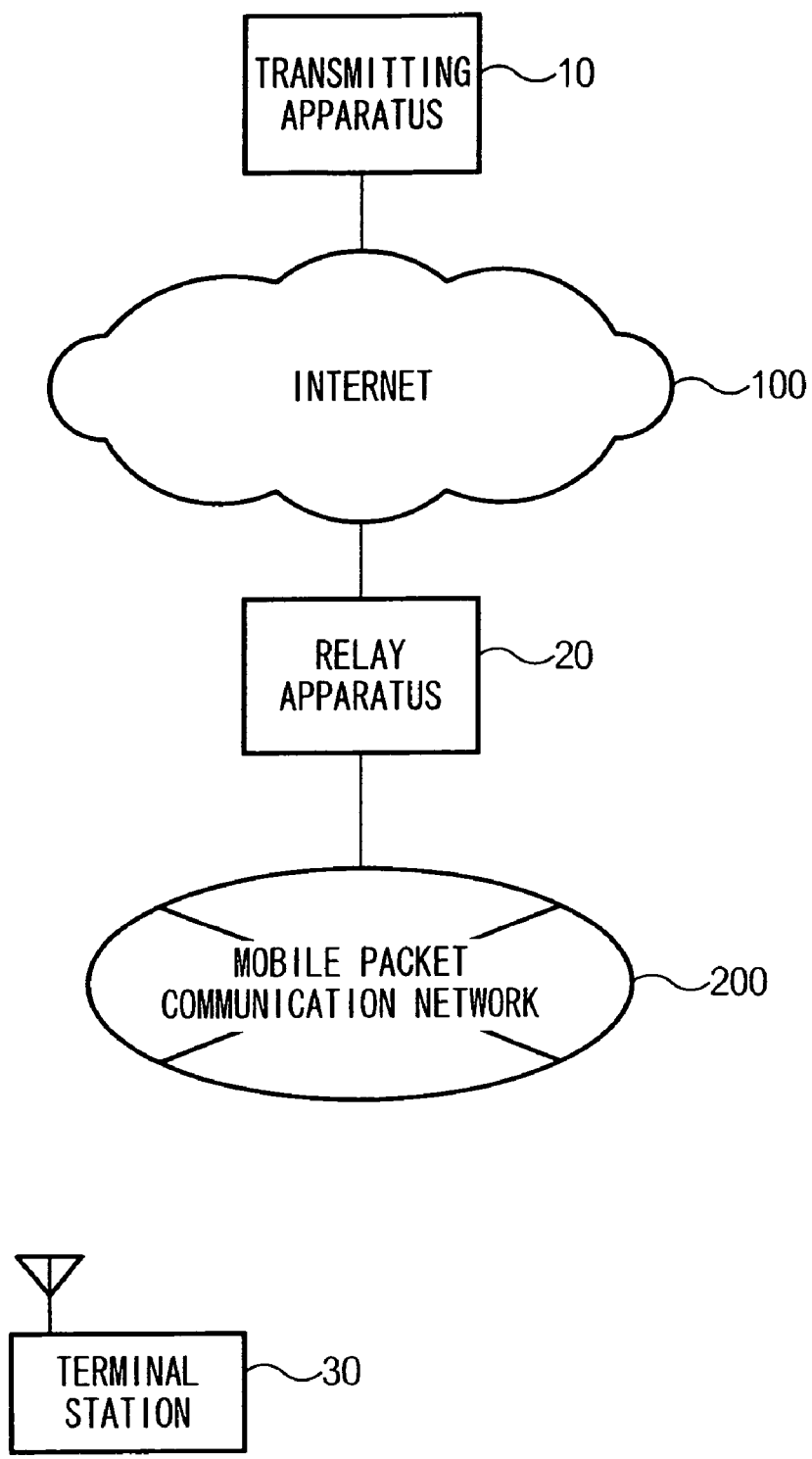
FIG. 1 is a block diagram illustrating an entire configuration of an email delivery system according to an embodiment of the present invention.

FIG. 1 is a block diagram illustrating an entire configuration of an email delivery system according to an embodiment of the present invention.

As shown in FIG. 1, the email delivery system according to the present embodiment includes a transmitting apparatus 10 connected to Internet 100, and a relay apparatus connected to Internet 100 and mobile packet communication network 200.

The email delivery system delivers email to terminal station 30 accommodated in mobile packet communication network 200. It is to be noted that, although only a transmitting apparatus 10 and a terminal station 30 are shown in FIG. 1, an email delivery system may include a plurality of transmitting apparatus 10 and a plurality of terminal stations 30. To keep the drawing concise, wireless base stations or the like, which constitute a mobile packet communication network 200, are not illustrated in FIG. 1.

Terminal station 30 is configured as a terminal station able to perform wireless communications by using its Web browsing function and email transmission/reception function. Terminal station 30 is, for example, configured as a mobile phone with both functions.

Terminal station 30 includes an input unit and a display unit, and is able to obtain a file by assigning the file with a Uniform Resource Locator (URL) from the input unit, according to its Web browsing function.

When terminal station 30 obtains a text file described in Hyper Text Markup Language (HTML) (the text file will be referred as 'HTML file' below), terminal station 30 interprets the details of the obtained HTML file in accordance with HTML syntax, so as to provide a user interface by displaying a user interface screen on its display unit on the basis of the interpretation.

Terminal station 30 includes a storage unit for storing a telephone number or the like of a user using terminal station 30.

Transmitting apparatus 10 is an information providing server apparatus operated by an information provider offering a service providing information via email.

Figure 2:
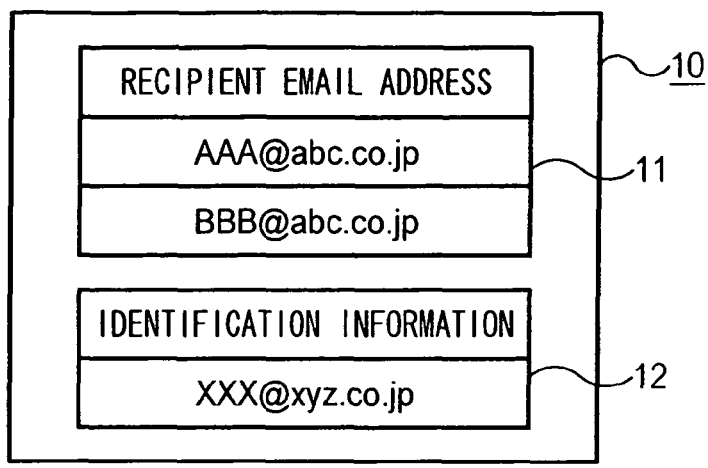
FIG. 2 is a drawing illustrating contents of transmitting apparatus 10 according to the same embodiment.

Transmitting apparatus 10 offers a service providing information via email by transmitting an email(s) providing information to an email address registered in recipient list 11 (illustrated in FIG. 2).

To accomplish the foregoing, transmitting apparatus 10 is able to transmit to terminal station 30 an HTML file, on receipt of which terminal station 30 displays a registration screen prompting a user to input his/her email address. The user of terminal station 30 is able to use the Web browsing function of terminal station 30 to register his/her email address in recipient list 11 of transmitting apparatus 10 using the registration screen displayed according to the received HTML file.

Figure 3:
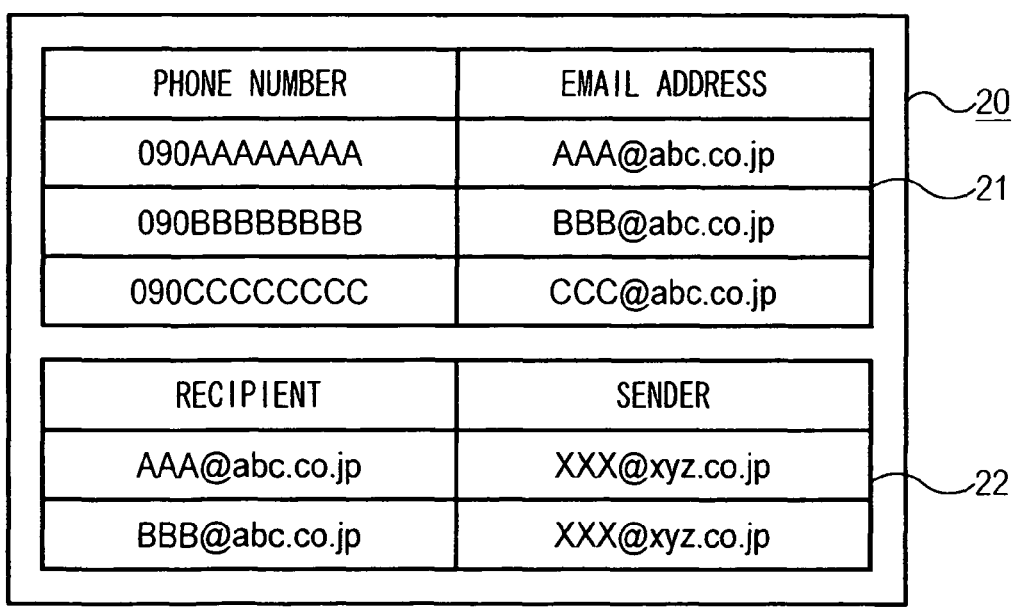
FIG. 3 is a drawing illustrating contents of relay apparatus 20 according to the same embodiment.

Relay apparatus 20 is operated by a communication carrier operating mobile packet communication network 200. Relay apparatus 20 relays communications between mobile packet communication network 200 and Internet 100. Relay apparatus 20 offers a communication service for connecting Internet 100 to a user of terminal station 30 who subscribes to the service. Relay apparatus 20 has a mailbox for each user of terminal station 30. Relay apparatus 20 is able to store in the mailbox an email addressed to a user. Relay apparatus 20 has a delivery permission table 22 (illustrated in FIG. 3) storing for each user of terminal station 30 identification information of a sender whose email is allowed to be delivered to the user.

On receiving an email addressed to a user, relay apparatus 20 stores the received email in the mailbox of the user only in a case that the identification information of the sender is registered in delivery permission table 22. Then, an email stored in a mailbox is delivered to the mobile phone of the corresponding user. To accomplish this, relay apparatus 20 is able to transmit to terminal station 30 an HTML file, which causes terminal station 30 to display an input screen prompting a user to input identification information of a sender The user of terminal station 30 is able to use the Web browsing function of terminal station 30 in the input screen displayed according to the received HTML file, so as to register identification information of a sender whose email is allowed to be delivered to his/her email address, in delivery permission table 22 of relay apparatus 20.

Accordingly, a user of terminal station 30 is able to use the email function of terminal station 30 to browse an email delivered from the mailbox of relay apparatus 20 which stores only emails transmitted from a sender whose email is allowed to be delivered to the user.

B. Transmitting Apparatus 10

B-1. Configuration

Figure 4:
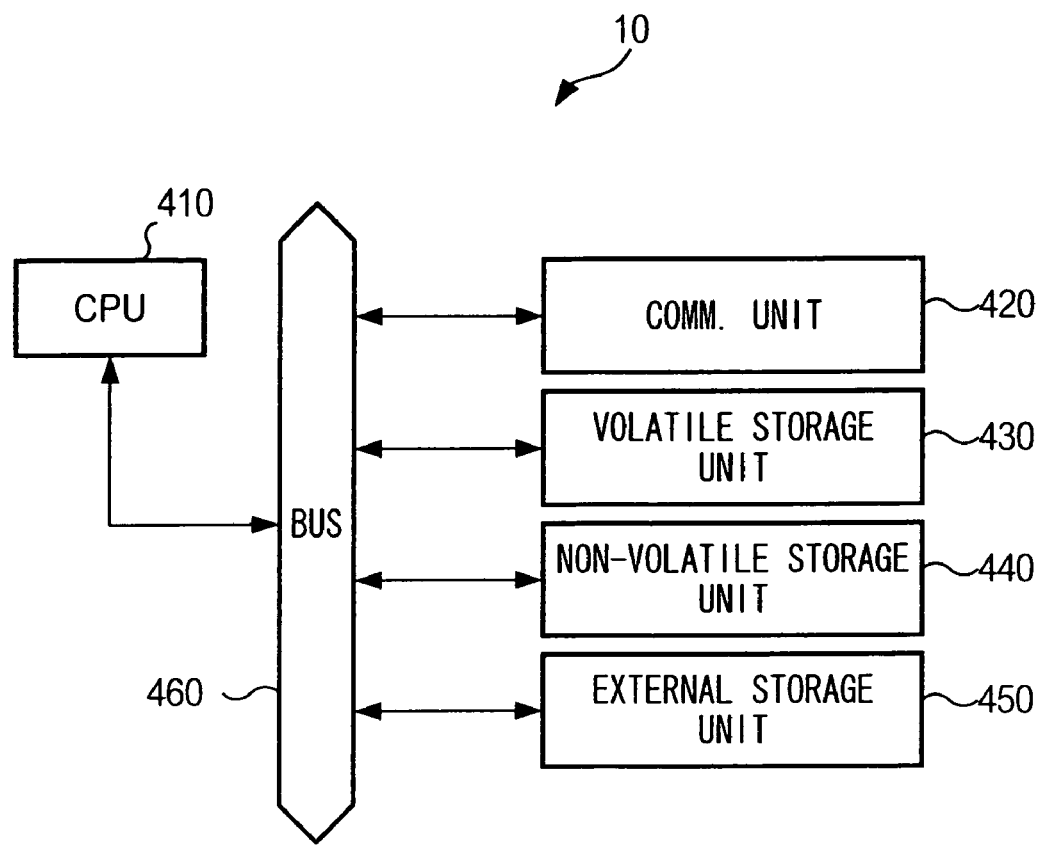
FIG. 4 is a drawing illustrating a configuration of transmitting apparatus 10 according to the same embodiment.

FIG. 4 is a drawing illustrating a configuration of transmitting apparatus 10.

As shown in FIG. 4, transmitting apparatus 10 includes a central processing unit (CPU) 410; a communication unit 420 connected to Internet 100; a volatile storage unit 430 (for example, Random Access Memory, RAM) used by CPU 410 as a working area; a non-volatile storage unit 440 (for example, a hard disk drive); an external storage unit 450 capable of reading data stored in a computer device readable storage medium (for example, a Compact Disk Read Only Memory, CD-ROM, a Floppy™ Disk, FD), and capable of outputting the read data to CPU 410; and bus 460 for handling data transfer between each of these components.

Communication unit 420 transmits to Internet 100 data supplied from CPU 410, and forwards to CPU 410 data received from Internet 100.

Non-volatile storage unit 440 stores an operating system program; a recipient list 11; identification information 12; a first HTML file; a second HTML file; and a recipient registration program.

Details of the recipient registration program will be described below.

Recipient list 11 stores an email address of a user who subscribes to a service for receiving information via email from an Information Provider operating transmitting apparatus 10.

Identification information 12 is used to identify in Internet 100 a sender (i.e. Information Provider) who transmits an email from transmitting apparatus 10. Identification information 12 is, for example, configured as an email address assigned to an Information Provider. Accordingly, an email transmitted from transmitting apparatus 10 includes identification information 12.

Figure 5:
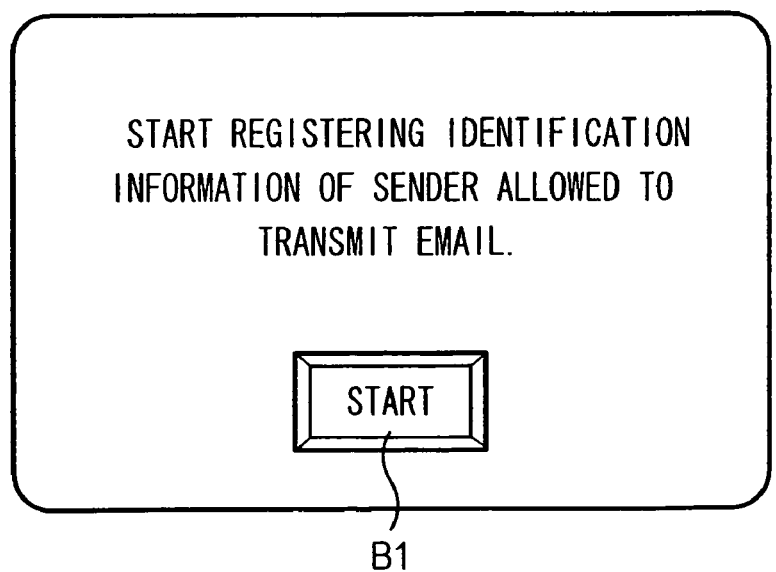
FIG. 5 is a drawing illustrating a process start instruction screen displayed at a display unit of terminal station 30 according to the same embodiment.

The first HTML file is an HTML file for displaying on terminal station 30 a start process instruction screen illustrated in FIG. 5 having a start button B1.

When a user of terminal station 30 selects start button B1, terminal station 30 generates, according to the first HTML file, a request for the third HTML file by assigning the URL of the third HTML file stored in relay apparatus 20, and transmits the request to relay apparatus 20. Further, according to the first HTML file, terminal station 30 generates the request such that the request includes the telephone number of the user of terminal station 30.

When a user of terminal station 30 manipulates the input unit to select start button B1 on the screen shown in FIG. 5, terminal station 30 generates a request for the third HTML file, and transmits the request to relay apparatus 20.

Figure 6:
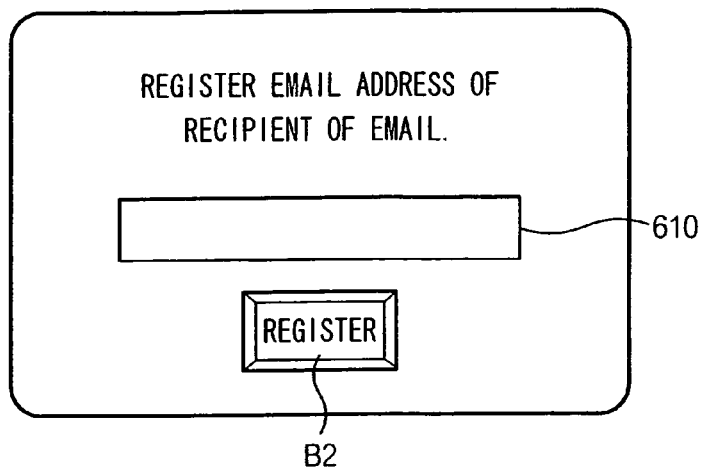
FIG. 6 is a drawing illustrating a recipient registration screen displayed in a display unit of terminal station 30 according to the same embodiment.

The second HTML file is an HTML file for displaying at terminal station 30 a recipient registration screen, as illustrated in FIG. 6, having a registration button B2 and an email address input field 610.

When a user of terminal station 30 inputs his/her email address in email address input field 610 and selects registration button B2, terminal station 30 generates, according to the second HTML file, a request for the email address input in email address input field 61 to be stored in recipient list 11 of transmitting apparatus 10, and transmits the request to transmitting apparatus 10.

B-2. Operations

When transmitting apparatus 10 is switched on, CPU 410 reads from non-volatile storage unit 440 an operating system program for controlling each component of transmitting apparatus 10, and starts the operating system. After the operating system has started up, CPU 410 reads the registration program stored in non-volatile storage unit 440, and starts the program. Until receiving an instruction to terminate registration program, CPU 410 performs, depending on the details of the request transmitted from terminal station 30, each one of the processes of: transmitting to terminal station 30 the first HTML file and the identification information 12; transmitting to terminal station 30 the second HTML file; and storing the email address of the user of terminal station 30 in recipient list 11.

Figure 7:
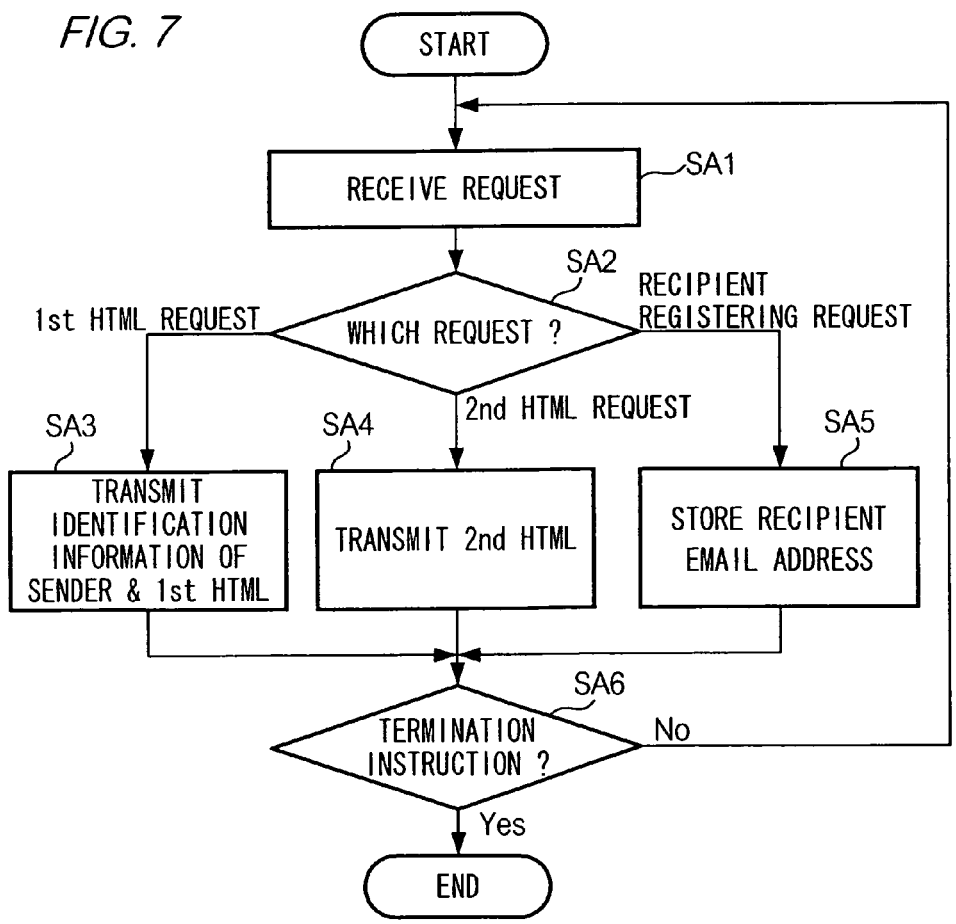
FIG. 7 is a flow chart illustrating a flow of a recipient registration process performed by transmitting apparatus 10 according to the same embodiment.

The details of the recipient registration program of CPU 410 will be described with reference to FIG. 7.

On receiving a request transmitted from terminal station 30 via communication unit 420 (Step SA1), CPU 410 determines the details of the received request (Step SA2).

In a case that the received request is determined as a request for the first HTML file (this request will be referred to as a first HTML request), CPU 410 reads identification information 12 and the first HTML file stored in non-volatile storage unit 440, generates a response including the read identification information 12 and the first HTML file, transmits the response to terminal station 30 via communication unit 420 (Step SA3) and advances to Step SA6.

In a case that the received request is determined as a request for the second HTML file (this request will be referred to as a second HTML request), CPU 410 reads the second HTML file stored in non-volatile storage unit 440, generates a response including the second HTML file, transmits the response to terminal station 30 via communication unit 420 (Step SA4), and advances to Step SA6.

In a case that the received request is determined as the recipient registration request, CPU 410 stores in recipient list 11 a user's email address included in the recipient registration request (Step SA5), and advances its operation to Step SA6.

CPU 410 determines whether it encounters an instruction to terminate the recipient registration program (Step SA6). In a case of receiving the instruction, CPU 410 terminates the recipient registration program and returns to Step SA1 and repeats the above operations.

C. Relay Apparatus 20

C-1. Configuration

Figure 8:
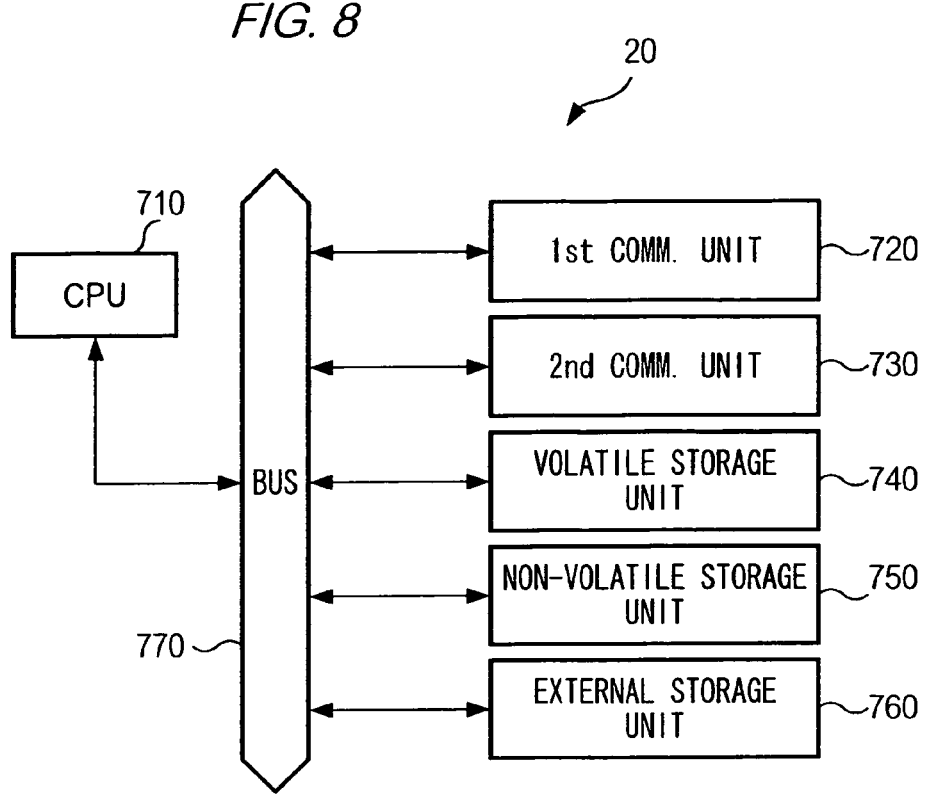
FIG. 8 is a drawing illustrating a configuration of relay apparatus 20 according to the same embodiment.

FIG. 8 is a block diagram illustrating a configuration of relay apparatus 20.

As shown in FIG. 8, relay apparatus 20 includes a central processing unit (CPU) 710, a first communication unit 720 connected to Internet 100, a second communication unit 730 connected to mobile packet communication network 200, a volatile storage unit 740, a non-volatile storage unit 750, such as a hard disk drive, an external storage unit 760, and a bus 770 handling data transfer between each of these components.

CPU 710, volatile storage unit 740, and external storage unit 760 have similar configurations to their counterpart components of transmitting apparatus 10. Thus, details of these components will not be described.

First communication unit 720 transmits to Internet 100 data supplied from CPU 710, and outputs to CPU 710 data received from Internet 100.

Second communication unit 730 transmits to mobile packet communication network 200 data supplied from CPU 710, and outputs to CPU 710 data received from mobile packet communication network 200.

Non-volatile storage unit 750 stores an operating system program, a customer table 21, a delivery permission table 22 a third HTML file, a fourth HTML file, a delivery permission registration program, and a mailbox.

Details of the delivery permission registration program will be described below.

Customer table 21 stores, in correspondence with a telephone number of a user of terminal station 30, an email address of a subscriber to a communication carrier.

For each subscriber, delivery permission table 22 stores, in correspondence with the email address of each user, the identification information of a sender whose email is allowed to be delivered to the email address of the user.

Figure 9:
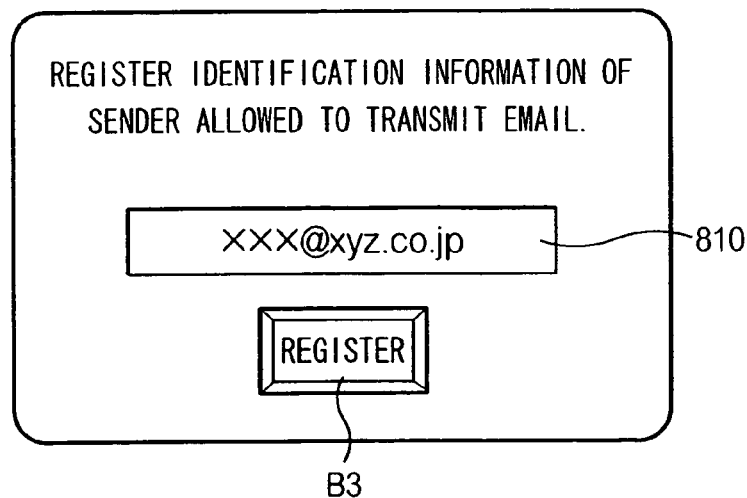
FIG. 9 is a drawing illustrating a delivery permission registration screen displayed at a display unit of terminal station 30 according to the same embodiment.

The third HTML file is an HTML file for displaying at terminal station 30 a delivery permission registration screen, as illustrated in FIG. 9, having a registration button B3 and a sender identification information input field 810.

When a user manipulating terminal station 30 selects registration button B3, terminal station 30 generates, according to the third HTML file, a request for the identification information displayed in sender identification information input field 810 to be stored in delivery permission table 22 of relay apparatus 20, and transmits the request to relay apparatus 20.

When a user manipulates the input unit of terminal station 30 to select registration button B3 in the screen illustrated in FIG. 9, terminal station 30 generates a request for the identification information displayed in sender identification information input field 810 to be stored in delivery permission table 22, and transmits the request to relay apparatus 20.

The fourth HTML file is an HTML file for displaying at terminal station 30 a process continuation instruction screen, as illustrated in FIG. 10, having a continue button B4.

When a user manipulating terminal station 30 selects continue button B4, terminal station 30 generates, according to the fourth HTML file, a request for the second HTML file by assigning the URL of the second HTML file stored in transmitting apparatus 10, and transmits the request to transmitting apparatus 10.

When a user of terminal station 30 manipulates the input unit to select continue button B4 in the screen illustrated in FIG. 10, terminal station 30 generates a request for the second HTML file, and transmits the request to transmitting apparatus 10.

C-2. Operations

When relay apparatus 20 is switched on, CPU 710 reads the operating system programs stored in non-volatile storage unit 750 and starts running the operating system. After starting up of the operating system, CPU 710 reads the delivery permission registration program stored in non-volatile storage unit 750, and starts running the program. Until receiving an instruction to terminate the delivery permission registration program, CPU 710 performs, depending on the request transmitted from terminal station 30, one of the processes of: transmitting to terminal station 30 the third HTML file; storing the identification information transmitted from terminal station 30 in delivery permission table 22; and transmitting the fourth HTML file to terminal station 30.

Details of the operations of the delivery permission registration program performed by CPU 710 will be described with reference to FIG. 11.

On receiving the request transmitted from terminal station 30 via second communication unit 730 (Step SB1), CPU 710 determines the details of the received request (Step SB2).

In a case that the received request is determined as a request for the third HTML file (this request will be referred to as a third HTML request), CPU 710 reads the third HTML file stored in non-volatile storage unit 750, transmits a response including the third HTML file to terminal station 30 via second communication unit 730 (Step SB3), and advances to Step SB6.

In a case that the received request is determined as a delivery permission registration request, CPU 710 obtains from customer table 21 the email address that is stored corresponding to the telephone number of a user using terminal station 30. CPU 710 stores in delivery permission table 22 sender identification information 12 included in the received delivery permission registration request corresponding to the obtained email address (Step SB4). CPU 710 reads from non-volatile storage unit 750 the fourth HTML file, and transmits to terminal station 30 a response including the fourth HTML file via second communication unit 730 (Step SB5). CPU 710, then advances to the process in Step SB6.

CPU 710 determines whether it encounters an instruction to terminate the delivery permission registration program (Step SB6). If it encounters the instruction, CPU 710 terminates the delivery permission registration program, whereas CPU 710 returns to Step SB1 and repeats the above-processes.

D. Example of Operation

Figure 12:
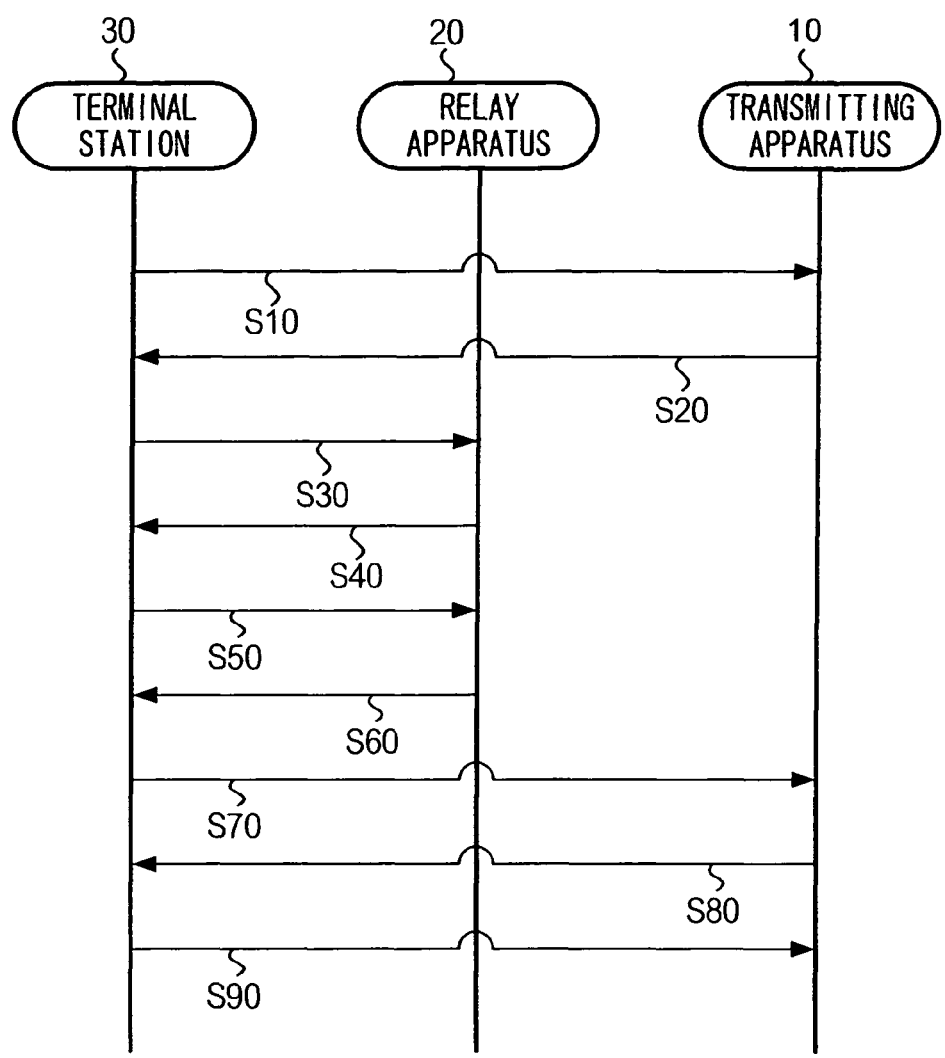
FIG. 12 is a sequence diagram illustrating a communication sequence performed by the email delivery system according to the same embodiment.

A typical operation of the email delivery system shown in FIG. 1 will be described with reference to the sequence diagram FIG. 12. As seen from customer table 21 shown in FIG. 3, an email address 'CCC@abc.co.jp' is assigned to a user having a telephone number '090CCCCCCCC' (this user will be referred as 'user C' below). As shown in FIG. 2, an email address 'XXX@xyz.co.jp' is assigned as identification information 12 of transmitting apparatus 10.

Transmitting apparatus 10 has already started the recipient registration program, and is ready for receiving a request from terminal station 30. Relay apparatus 20 has already started the delivery permission registration program, and is ready for receiving a request from terminal station 30.

When user C manipulates the input unit of terminal station 30 to start the Web browsing program, and inputs the URL of the first HTML file in the Web browsing program, terminal station 30 generates request S10 requesting the first HTML file, and transmits request S10 to transmitting apparatus 10 (Step S10).

Transmitting apparatus 10 receives request S10 transmitted from terminal station 30. Since the received request S10 is the first HTML request, transmitting apparatus 10 transmits to terminal station 30 response S20 including the first HTML file and the identification information 12, 'XXX@xyz.co.jp' via communication unit 420 (Step S20).

On receiving response S20 transmitted from transmitting apparatus 10, terminal station 30 stores in storage unit the identification information 12 included in response S20. Terminal station 30 interprets the first HTML file included in response S20, and displays a start instruction screen (FIG. 5) on its display unit.

When user C manipulates the input unit to select start button B1 in the process start instruction screen, terminal station 30 generates request S30 requesting the third HTML file, and transmits to relay apparatus 20 request S30 including a telephone number '090CCCCCCCC' of a user using the terminal station 30 (Step S30).

Relay apparatus 20 receives request S30 transmitted from terminal station 30. Since the received request S30 is the third HTML request, relay apparatus 20 transmits to terminal station 30 a response S40 including the third HTML file via second communication unit 730 (Step S40).

On receiving response S40 transmitted from relay apparatus 20, terminal station 30 interprets the third HTML file included in response S40, and displays the delivery permission registration screen (FIG. 9) on its display unit, so that identification information 12 obtained from transmitting apparatus 10 is set in sender identification information input field 810 of the screen.

When user C manipulates the input unit to select registration button B3 in the delivery permission registration screen, terminal station 30 generates request S50 for the identification information displayed in sender identification information input field 810 to be stored in delivery permission table 22, and transmits request S50 to relay apparatus 20 (Step S50).

Relay apparatus 20 receives request S50 transmitted from terminal station 30 via second communication unit 730. Since the received request S50 is the delivery permission registration request, relay apparatus 20 stores the identification information included in request S50 in delivery permission table 22 so that the identification information corresponds to the email address of user C. Relay apparatus 20 transmits response S60 including the fourth HTML file to terminal station 30 via second communication unit 730 (Step S60).

On receiving response S60 transmitted from relay apparatus 20, terminal station 30 interprets the fourth HTML file included in response S60, and displays process continuation instruction screen at its display unit.

When user C manipulates the input unit to select continue button B4 in the process continuation instruction screen, terminal station 30 generates request S70 for the second HTML file, and transmits request S70 to transmitting apparatus 10 (Step S70).

Transmitting apparatus 10 receives request S70 transmitted from terminal station 30 via communication unit 420. Since request S70 is the second HTML request, transmitting apparatus 10 generates response S80 including the second HTML file, and transmits the response S80 to terminal station 30 via communication unit 420 (Step S80).

Terminal station 30 receives the response S80 transmitted from transmitting apparatus 10. Terminal station 30 interprets the second HTML file included in response S80, and displays recipient registration screen (FIG. 6) on its display unit.

When user C manipulates the input unit to input the email address of user C in email address input field 610 and selects registration button B2 in the recipient registration screen, terminal station 30 generates request S90 for requesting the email address input in email address input field 610 to be registered in recipient list 11, and transmits request S90 to transmitting apparatus 10 (Step S90).

Transmitting apparatus 10 receives request S90 transmitted from terminal station 30 via communication unit 420. Since request S90 is the recipient registration request, transmitting apparatus 10 stores in recipient list 11 the email address included in request S90.

Figures 13, 14:
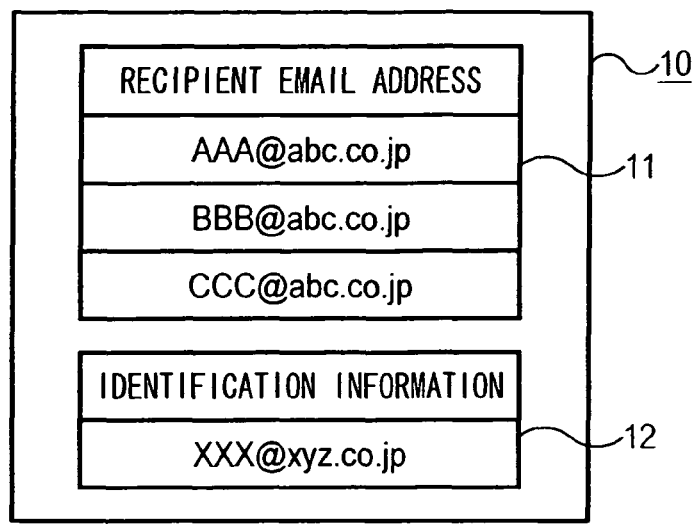
FIG. 13 is a drawing illustrating contents of transmitting apparatus 10 according to the same embodiment.
FIG. 14 is a drawing illustrating contents of relay apparatus 20 according to the same embodiment.

After the above-described operation, the contents of recipient list 11, which is stored in non-volatile storage unit 440 of transmitting apparatus 10, is shown in FIG. 13. The contents of delivery permission table 22, which is stored in non-volatile storage unit 750 of relay apparatus 20, is shown in FIG. 14.

Then, since the sender identification information of the email is registered in delivery permission table 22 corresponding to the email address of user C, every time relay apparatus 20 receives an email transmitted from transmitting apparatus 10 and addressed to the email address of user C, relay apparatus 20 stores the email in the mailbox of user C, and transmits the email to terminal station 30 of user C.

E. Modifications

E-1. Modification 1

Terminal station 30 may be configured as a Personal Digital Assistant (PDA) having a Web browsing function and an email client function, or a Personal Computer having the same functions.

E-2. Modification 2

Terminal station 30 may be accommodated in a communication network connected to the Internet 100 via relay apparatus 20.

In an exemplary case that terminal station 30 is configured as a PDA having a Web browsing function and an email browsing function or a PC having the same functions, terminal station 30 may be accommodated in a wireless Local Area Network (LAN) connecting the Internet 100 via relay apparatus 20. Alternatively, terminal station 30 may be wired to a LAN connected to the Internet 100.

E-3. Modification 3

The mailbox may be located in a separate email server connecting mobile packet communication network 200, rather than in relay apparatus 20.

In this configuration, on receiving an email forwarded via Internet 100, relay apparatus 20 may forward the email to the email server, only if the sender identification information of the email is stored in delivery permission table 22 corresponding to the recipient email address of the email.

E-4. Modification 4

Delivery permission table 22 may store identification information of a sender allowed by a user to transmit to deliver emails addressed to the email address of the user, in a one-to-one manner corresponding to the email address of the user. Alternatively, delivery permission table 22 may store a plurality of identification information of senders corresponding to an email address of a user.

E-5. Modification 5

The information for identifying a user should be information according to which relay apparatus 20 is able to identify that a user requesting sender identification information to be registered in delivery permission table 22 is a user who has a contract with a communication carrier operating mobile packet communication network 200. The information may be, for example, a user ID.

E-6. Modification 6

The identification information for identifying a sender should be information which can identify a sender of an email. The identification information may be, for example, the domain name of a sender. This configuration has the same effect as a case that all email addresses including this domain name are stored in delivery permission table 22 of relay apparatus 20.

As the identification information for identifying a sender, either an email address or a domain name may be selected by a user.

Specifically, transmitting apparatus 10 (a sender) stores both an email address and a domain name as its identification information. In a case of receiving a request from terminal station 30 to register an email address in recipient list 11, transmitting apparatus 10 transmits to terminal station 30 the email address and the domain name stored as its identification information. Then either the received email address or the received domain name may be selected by the user to be registered in delivery permission table 22 of relay apparatus 20. Further, the identification information for identifying a sender may be a part of an email address, for example, a prescribed number of characters from the beginning of the email address. Alternatively, the identification information may be a part of a domain name, for example, a prescribed number of characters from the end of the domain name.

E-7. Modification 7

The file interpreted by a Web browsing program to accomplish a user interface on terminal station 30 should be written in a language that the Web browsing program is able to interpret. The file may be, for example, a file written in XML (eXtensible Markup Language). A user interface may be accomplished on terminal station 30 by executable codes in a Web browsing program, such as Java™ applets.

The received HTML file may be deleted from terminal station 30, after the termination of the process. For example, when start button B1 is selected after terminal station 30 interprets the first HTML file received from transmitting apparatus 10 and displays the start instruction screen shown in FIG. 5, terminal station 30 obtains the third HTML file from relay apparatus 20 and deletes the received first HTML file.

E-8. Modification 8

Relay apparatus 20 may update the fourth HTML file stored in non-volatile storage unit 440, so that the URL of the second HTML file written in the fourth HTML file corresponding to continue button B4 is updated to the URL of the second HTML file received from terminal station 30.

Specifically, transmitting apparatus 10 transmits to terminal station 30 the URL of the second HTML file while transmitting the first HTML file. Transmitting apparatus 10 interprets the first HTML file, and displays the process start screen shown in FIG. 5. When start button B1 is selected, terminal station 30 transmits to relay apparatus 20 a request for the third HTML file, the request including the URL received from transmitting apparatus 10. On receiving the request, relay apparatus 20 transmits to terminal station 30 a response including the third HTML file, updates the fourth HTML file stored in non-volatile storage unit 440, so that the URL received from terminal station 30 corresponds to continue button B4.

Thus, a URL of the HTML file corresponding to continue button B4 is transmitted from terminal station 30, and the received URL corresponds to continue button B4. According to this configuration, relay apparatus 20 does not have to store for each transmitting apparatus a fourth HTML file, even if a plurality of transmitting apparatuses 10 exist.

E-9. Modification 9

Relay apparatus 20 may be configured to perform necessary processes only when a time difference between the current time and the start time including the request received from terminal station 30 is equal to or smaller than the prescribed time.

Specifically, transmitting apparatus 10 and relay apparatus 20 each have a clock unit for obtaining the current time. Transmitting apparatus 10 uses the clock unit to obtain a time of receiving the first HTML request (this time will be referred as 'start time') in case of receiving the first HTML request from terminal station 30. Transmitting apparatus 10 transmits to terminal station 30 the start time, the sender identification information, and the first HTML file. Terminal station 30 interprets the received first HTML file, and displays the screen shown in FIG. 5. When start button B1 is selected, terminal station 30 transmits to relay apparatus 20 the third HTML request including the received start time. On receiving the third HTML request, relay apparatus 20 uses the clock unit to obtain the current time. Relay apparatus 20 may transmit the third HTML file to terminal station 30, only when the time difference between the obtained current time and the start time included in the received third HTML request is equal to or smaller than the prescribed time.

Relay apparatus 20 may authenticate a user of terminal station 30 to authorize a user to use relay apparatus 20, for example, with a password. Only if a user is authenticated, identification information of a sender allowed to deliver emails to the user may be registered corresponding to the email address of the user.

E-10. Modification 10

A computer device may work similarly to transmitting apparatus 10 according to the present invention, so that the computer device reads from a computer device readable storage medium the first HTML file, the second HTML file, the recipient registration program, and the like, and executes the program.

A computer device may work similarly to relay apparatus 20 according to the present invention, so that the computer device reads from a computer device readable storage medium the third HTML file, the fourth HTML file, delivery permission registration program, and the like, and executes the program.

The invention claimed is:

1. An email delivery system, comprising:
   a terminal station accommodated in a first communication network, the terminal station configured to receive emails from senders transmitted via the first communication network;
   the terminal station further configured to transmit a registration request to an information provider, and receive identification information from a transmitting apparatus of the information provider responsive to the user registration request, the transmitting apparatus accommodated in a second communication network;
   the terminal station further configured to transmit the received identification information of the information provider over the first communication network; and
   a relay apparatus configured to receive the identification information of the information provider transmitted from the terminal station over the first communication network, and store the received identification information in association with an email address of a user of the terminal station;
   the relay apparatus further configured to control the terminal station to communicate with the information provider to register the email address of the user of the terminal station as a recipient email address at the transmitting apparatus of the information provider identified with the identification information;
   the relay apparatus further configured to receive all emails forwarded from the second communication network to the first communication network; and
   the relay apparatus further configured to forward to the terminal station only those emails that include the identification information stored by the relay apparatus in association with the email address of the user of the terminal station.

2. The email delivery system according to claim 1, wherein the identification information of the respective sender is assigned in the second communication network to identify the respective sender.

3. The email delivery system according to claim 1, wherein the identification information of the respective sender is a prescribed number of characters that begin an email address of the respective sender.

4. The email delivery system according to claim 1, wherein the identification information of the respective sender is configured as a prescribed number of characters that end an email address of the respective sender.

5. The email delivery system according to claim 1, wherein the transmitting apparatus of the respective sender is a plurality of transmitting apparatuses of a plurality of respective senders each having different identification information,
the terminal station further configured to prompt a user of the terminal station to select one of the plurality of respective senders for whom identification information is received, and
the terminal station further configured to transmit the identification information of the one of the plurality of respective senders to the relay apparatus in response to selection by the user of the one of the plurality of respective senders.

6. The email delivery system according to claim 1, wherein
the relay apparatus is further configured to control the terminal station so that the terminal station provides a user interface to transmit the identification information to the relay apparatus, and
the relay apparatus is further configured to receive the identification information transmitted in response to a user input received via the user interface.

7. The email delivery system according to claim 6, wherein the relay apparatus is further configured to transmit to the terminal station a file, written in a prescribed language, the file describing procedures to provide the user interface and to cause the terminal station to forward the identification information to the relay apparatus in response to receipt of the user input.

8. The email delivery system according to claim 7, wherein the terminal station is further configured to transmit the identification information and then delete the file transmitted from the relay apparatus.

9. The email delivery system according to claim 7, wherein the relay apparatus is further configured to prohibit the terminal station from storing a locator of the file indicative that the file was provided from the relay apparatus.

10. The email delivery system according to claim 1, wherein the relay apparatus is further configured to determine whether to allow the user of the terminal station to make use of the relay apparatus itself, upon receipt of the identification information transmitted from the terminal station; and
only in a case of allowing the user to make use of the relay apparatus, the relay apparatus is further configured to obtain the email address of the user, and store the obtained email address in association with the identification information transmitted from the terminal station.

11. The email delivery system according to claim 1, wherein
the terminal station is further configured to transmit to the relay apparatus the received identification information as well as time information indicating a time the identification information is received from the transmitting apparatus,
the relay apparatus is further configured to compare the time information to a time of receipt by the relay apparatus of the identification information and the time information transmitted from the terminal station, and
the relay apparatus is further configured to store the received identification information only in a case that a difference between the time information and the time of receipt is shorter than a predetermined period of time.

12. The email delivery system according to claim 1, wherein
the identification information comprises a registration screen, and the terminal station is further configured to provide the registration screen in a user interface to prompt for transmittal of the identification information to the relay apparatus, and
the relay apparatus is further configured to receive an identifier of the terminal station and a delivery permission request transmitted in response to a user input to the registration screen received via the user interface.

13. The email delivery system according to claim 1, wherein the relay apparatus is configured to control the terminal station using a file transmitted from the relay apparatus to the terminal station, the file executable with the terminal station to initiate communication with the information provider to register the email address of the user of the terminal station.

14. The email delivery system according to claim 13, wherein the file is executable by the terminal station in response to a user input to the terminal station, the file executable to generate a request for registration information from the information provider.

15. A relay apparatus, comprising:
a first communication unit configured to receive identification information from a terminal station over a first communication network, the identification information identifying a sender of an email which a user of the terminal station wishes to receive;
a storage unit configured to store the identification information received by the first communication unit in association with an email address of the user of the terminal station;
a processor configured to direct the terminal station to transmit a request to register the email address of the user as a recipient email address at a transmitting apparatus of the sender identified with the identification information; and
a second communication unit configured to receive emails over a second communication network, the second communication network different from the first communication network;
the processor further configured to forward to the terminal station over the first communication network those received emails confirmed to include the identification information of the sender stored in association with the email address of the user.

16. The relay apparatus of claim 15, wherein the identification information is included in a first file generated with the transmitting apparatus, the first file configured to provide a display on the terminal station, the first file further configured to enable the transmitting apparatus to generate and initiate transmission to the relay apparatus of a request for a second file from the relay apparatus, the second file including an identifier of the terminal station.

17. The relay apparatus of claim 16, wherein the identifier of the terminal station is a telephone number of the terminal station, and the relay apparatus is further configured to identify the email address of the user of the terminal station based on the telephone number, and store the identification information in association with the telephone number and the email address of the user.

18. The relay apparatus of claim 15, wherein the processor is further configured to generate and transmit to the terminal station a delivery permission registration screen for display with the terminal station to direct the terminal station to transmit the request, the delivery permission registration screen comprising a user selection selectable by the user to initiate generation and transmittal to the transmitting apparatus of the request to register the email address of the user at the transmitting apparatus.

19. The relay apparatus of claim 15, wherein the processor is configured to direct the terminal station with a first file transmitted from the relay apparatus to the terminal station, the first file executable by the terminal station to generate a user input instruction screen and the request, the request generated by the terminal station by execution of the first file in response to receipt of a user input in the user input instruction screen.

20. The relay apparatus of claim 19, wherein the request comprises an identifier of a second file available from the sender of the email, the second file executable by the terminal station to generate a user input registration screen.

21. A method of selectively delivering email messages to a terminal station, the method comprising:
- a relay device communicating with the terminal station over a first communication network;
- the relay device also communicating with an information providing server over a second communication network;
- the relay device receiving from the terminal station identification information of the information providing server, the identification information obtained by the terminal station from the information providing server;
- the relay device storing the identification information in association with an identifier of a user of the terminal station;
- the relay device directing the terminal station to register with the information providing server to receive communications from the information providing server;
- the relay device receiving over the second communication network an email addressed to the user of the terminal station based on registration by the terminal station with the information providing server;
- confirming with the relay device that the email includes the identification information of the information providing server stored in association with the identifier of the user of the terminal station; and
- the relay device, responsive to confirmation, relaying the email to the terminal station over the first communication network.

22. The method of claim 21, further comprising the initial act of transmitting, with the terminal station, a service registration request for receipt by the information providing server, and receiving with the terminal station from the information providing server the identification information of the information providing server in response to the service registration request.

23. The method of claim 22, wherein receiving with the terminal station the identification information comprises displaying a process instruction screen on the terminal station, and generating and transmitting to the relay device a relay registration request that includes the identification information in response to receipt of a user selection from the process instruction screen.

24. The method of claim 21, wherein the relay device directing the terminal station to register with the information providing server comprises the relay device transmitting a file for receipt and display by the terminal station, the file comprising a user selection to initiate registration, and code responsive to selection by the user of the user selection to generate and transmit a registration request to the information providing server.

* * * * *